C. M. CHEATHAM.
VEHICLE FENDER.
APPLICATION FILED MAR. 20, 1917.
1,232,220.
Patented July 3, 1917.
2 SHEETS—SHEET 1.
Fig. 1.
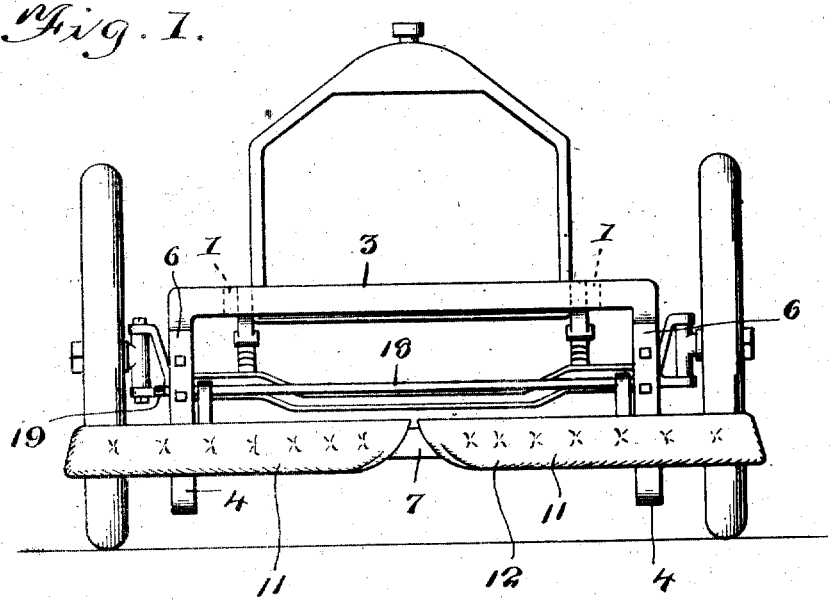
Fig. 4.
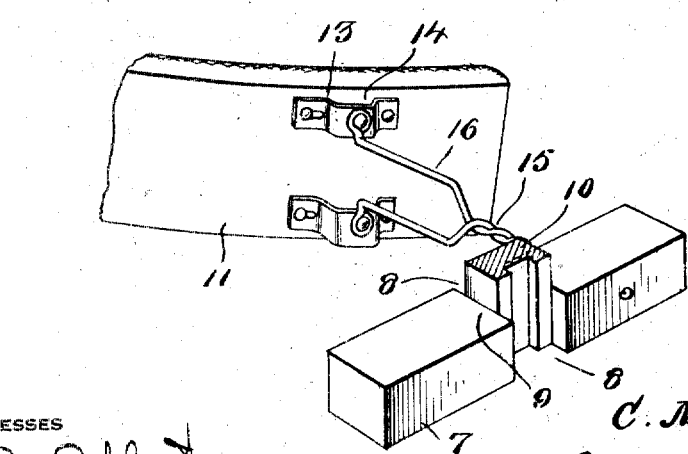
Fig. 5.
WITNESSES
E. P. Rupport
P. M. Smith
INVENTOR
C. M. Cheatham
BY Victor J. Evans
ATTORNEY

C. M. CHEATHAM.
VEHICLE FENDER.
APPLICATION FILED MAR. 20, 1917.

1,232,220.

Patented July 3, 1917.
2 SHEETS—SHEET 2.

WITNESSES
E. P. Pulpfant.
R. M. Smith

INVENTOR
C. M. Cheatham
BY Victor J. Evans
ATTORNEY

UNITED STATES PATENT OFFICE.

CONRAD M. CHEATHAM, OF REHOBOTH, VIRGINIA.

VEHICLE-FENDER.

1,232,220.    Specification of Letters Patent.    Patented July 3, 1917.

Application filed March 20, 1917. Serial No. 156,087.

*To all whom it may concern:*

Be it known that I, CONRAD M. CHEATHAM, a citizen of the United States, residing at Rehoboth, in the county of Lunenburg and State of Virginia, have invented new and useful Improvements in Vehicle-Fenders, of which the following is a specification.

This invention relates to vehicle fenders, the object in view being to produce a fender which is particularly adapted to be mounted upon an automobile, motor truck or similar vehicle, the construction adapting the main body of the fender, frequently called the scoop to be detached from the hanger section of the fender which hanger section is clamped or fastened in fixed relation to the frame or axle of the machine; also to provide means whereby the impact of a person or object against the fender is cushioned so as to prevent injury of a person or injury of the machine due to sudden impact with an object or obstruction.

A further object of the invention is to provide means mounted upon the scoop or removable section of the fender, whereby the latter may be raised and lowered and sustained at any desired elevation in accordance with road conditions and the desire of the operator of the vehicle.

With the above and other objects in view, the invention consists in the novel construction, combination and arrangement of parts, herein fully described, illustrated and claimed.

Figure 1 is a front elevation of the fender, shown in its applied relation to an automobile.

Fig. 4 is a fragmentary perspective view looking toward the rear of one of the pilot boards, showing the spring connection between the same and the main fender bar.

Fig. 5 is a fragmentary section through one of the pilot boards.

Figure 2:
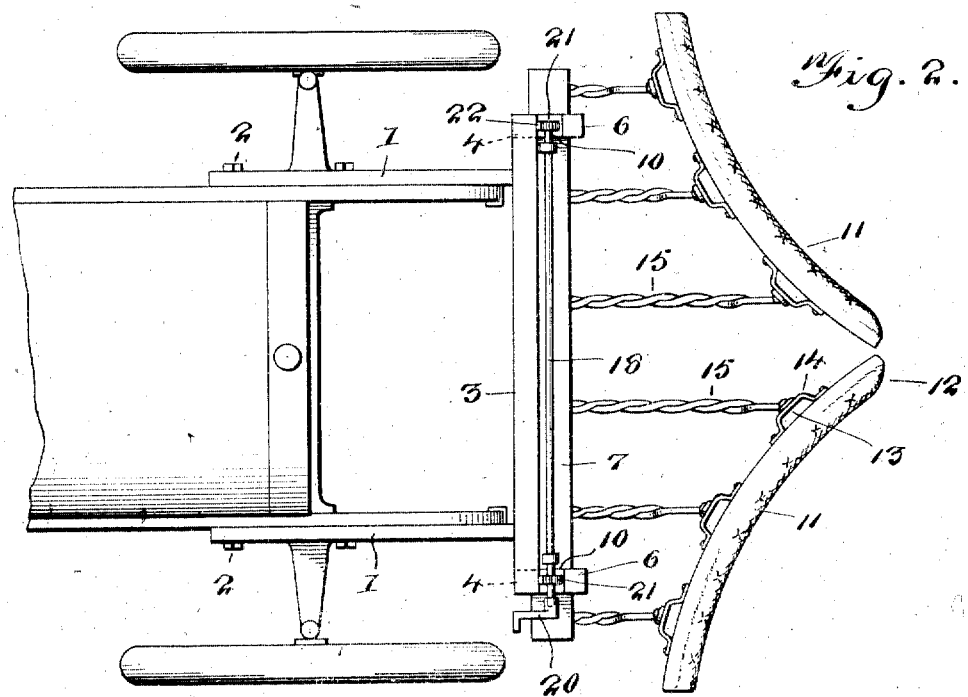
Fig. 2 is a plan view of the same showing the relation of the stationary hanger to the front axle of a vehicle.

The invention contemplated in this invention comprises a hanger frame consisting of a pair of supporting bars 1 detachably fastened to the front axle or frame of the vehicle by clamping means indicated at 2. The bars 1 extend forwardly to a point in advance of the radiator of the automobile and are substantially parallel to each other and are fixedly connected at their forward extremities to a cross bar 3. This cross bar extends at its opposite ends beyond the supporting bars 1 and has fixedly secured to the opposite extremities thereof downwardly extending uprights 4 so constructed as to provide substantially vertical guide-ways 5 and vertical guides 6 which serve to sustain the body or scoop section of the fender in place and in readiness to deflect or pick up a person or object with which the fender comes in contact.

Mounted for vertical movement in the guide-ways 5 is a main fender bar 7 which occupies a normally horizontal position. The bar 7 extends at its opposite ends beyond the uprights 5 and is formed in the front and rear faces thereof with grooves or recesses 8, leaving a shank portion 9 of proper width to slide easily in a substantially vertical path in the guide-ways 5. Extending upwardly from the reduced shanks 9 are tongues 10 of the same width as the shanks or reduced portions 9 of the bar 7, the tongues 10 serving to hold the scoop in a substantially horizontal position and preventing the tilting or sagging thereof.

Figure 3:
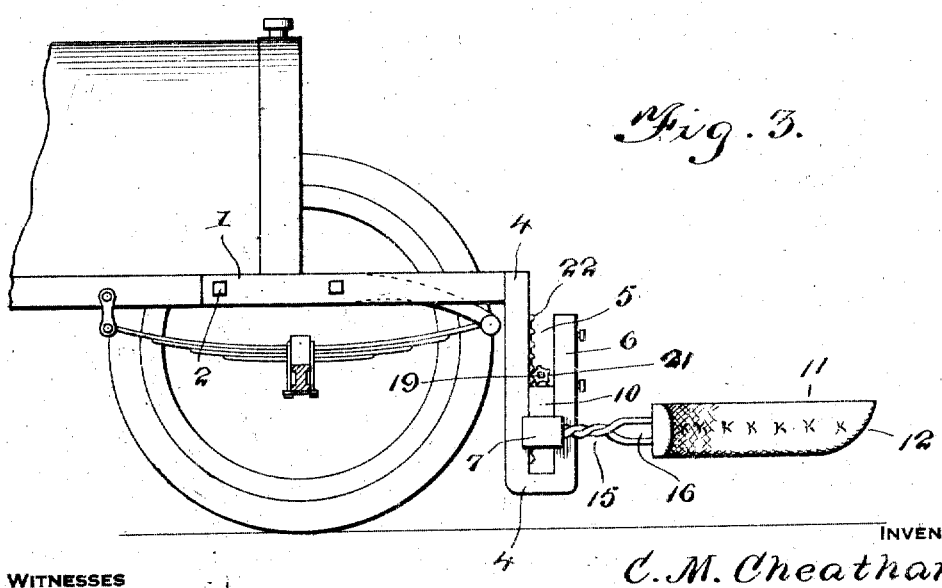
Fig. 3 is a side elevation thereof.

Located in advance of the fender bar 7 and the hanger frame are curvilinear pilot boards 11 having their concaved faces disposed in a forward direction. These fender boards converge toward their forward extremities where they are arranged in close proximity to each other and rounded to provide runner-like faces 12 which prevent the convergent extremities of the fender boards from catching in the road surface and injuring the fender. Secured to the rear face of each fender board 11 are two series of springs 13 having bowed central portions 14, said springs being arranged in pairs, one above the other as shown. Extending from each pair of springs 13 rearwardly to the fender bar 7 is a thrust member 15 the rear end of which is fixedly attached to the bar 7. The forward end of each thrust member 15 is forked or branched as indicated at 16 and the branches are deflected upwardly and downwardly and attached to the bowed portions 14 of the springs 13 as shown in Fig. 3. The thrust members 15 preferably extend as nearly perpendicular to the fender boards 11 as practical and therefore bear an angular relation to the fender bar 7 so that they will take the thrust and cushion the blow received by the pilot boards 11 with which they are associated.

Each of the pilot boards, under the preferred embodiment of the invention, has springs or resilient bumpers 17 secured to the front face thereof and covered with any suitable material such as raw hide, leather or the like to prevent injury to a person when struck by the fender. The pilot boards by reason of their rearward divergence from a central point tend to brush aside any person or object coming in contact with the fender while the thrust members 15 serve as a slatted floor or support to catch a person in case he is tripped by the fender and not brushed aside.

The fender may be bodily adjusted to any desired elevation by means comprising a pinion shaft 18 which is journaled in bearings formed in the tongues 10, said shaft having one end squared as shown at 19 to receive a detachable operating crank 20. Fast on the pinion shaft are pinions 21 which engage the rack faces 22 extending vertically on the forward sides of the uprights 4. The construction just described enables the main body of the fender or scoop to be elevated and lowered to accommodate the same to roads of different characters, it being obvious that where a smooth roadway is being traveled over, the fender may be located at a lower elevation than where the road is rough. Whenever desired, the scoop or main body of the fender may be elevated and entirely removed from the hanger frame, as for example in large cities where the streets are smooth and fenders are not required by the police regulations.

I claim:—

1. The combination with a vehicle, of a hanger frame having a fixed relation to the vehicle frame and projecting to a point in advance thereof and also provided with pendant upright portions having vertical guide-ways, a scoop comprising a main bar having its end portions extending through and beyond said guide-ways and movable in a substantially vertical direction in said guide-ways, said bar having relatively narrow portions which slidingly fit in said guide-ways and tongues which are also slidable in said guide-ways to support the body of the fender in a substantially horizontal position, pilot boards located in advance of said fender bar and converging toward a central point, thrust members fixedly connected at their rear ends to said fender bar, and cushioning springs attached to the rear faces of said pilot boards and having said thrust members connected thereto.

2. The combination with a vehicle, of a hanger frame having a fixed relation to the vehicle frame and projecting to a point in advance thereof and also provided with pendant upright portions having vertical guide-ways, a scoop comprising a main bar having its end portions extending through and beyond said guide-ways and movable in a substantially vertical direction in said guide-ways, said bar having relatively narrow portions which slidingly fit in said guide-ways and tongues which are also slidable in said guide-ways to support the body of the fender in a substantially horizontal position, pilot boards located in advance of said fender bar and converging toward a central point, thrust members fixedly connected at their rear ends to said fender bar, and cushioning springs attached to the rear faces of said pilot boards and having said thrust members connected thereto, said springs being arranged in pairs one above the other, and the forward end of each thrust member being forked and the branches thereof being secured to the respective pair of springs.

3. The combination with a vehicle, of a hanger frame having a fixed relation to the vehicle frame and projecting to a point in advance thereof and also provided with pendant upright portions having vertical guide-ways, a scoop comprising a main bar having its end portions extending through and beyond said guide-ways and movable in a substantially vertical direction in said guide-ways, said bar having relatively narrow portions which slidingly fit in said guide-ways and tongues which are also slidable in said guide-ways to support the body of the fender in a substantially horizontal position, pilot boards located in advance of said fender bar and converging toward a central point, thrust members fixedly connected at their rear ends to said fender bar, and cushioning springs attached to the rear faces of said pilot boards and having said thrust members connected thereto, a pinion shaft journaled on said fender bar, pinions on said shaft, and rack faces on the uprights of the hanger frame with which said pinions mesh, whereby the body of the fender may be raised and lowered.

4. The combination with a vehicle, of a hanger frame having a fixed relation to the vehicle frame and projecting to a point in advance thereof and also provided with pendant upright portions having vertical guide-ways, a scoop comprising a main bar having its end portions extending through and beyond said guide-ways and movable in a substantially vertical direction in said guide-ways, said bar having relatively narrow portions which slidingly fit in said guide-ways and tongues which are also slidable in said guide-ways to support the body of the fender in a substantially horizontal position, pilot boards located in advance of said fender bar and converging toward a central point, thrust members fixedly connected at their rear ends to said fender bar, and cushioning springs attached to the rear faces of said pilot boards and having said thrust members connected thereto, the forward extremities of the pilot boards being rounded to provide upwardly curving runner-like faces.

In testimony whereof I affix my signature.

CONRAD M. CHEATHAM.